April 25, 1961  J. A. OGLE  2,981,941
SELECTIVE OPTICAL SCREEN AND SYSTEM
Filed Aug. 22, 1956  7 Sheets-Sheet 1

INVENTOR.
JAMES A. OGLE
BY
ATTORNEY

April 25, 1961　　　J. A. OGLE　　　2,981,941
SELECTIVE OPTICAL SCREEN AND SYSTEM
Filed Aug. 22, 1956　　　7 Sheets-Sheet 2
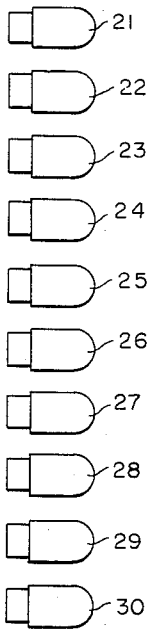
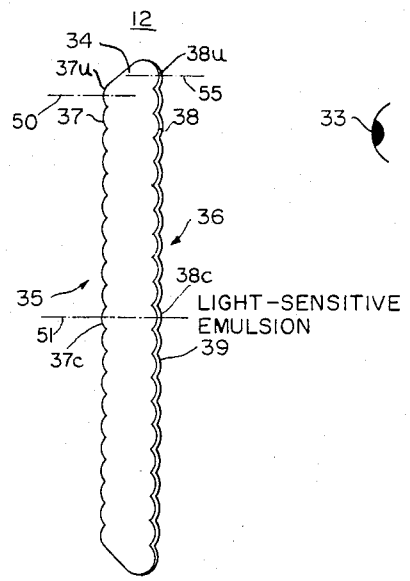
*Fig. 3*
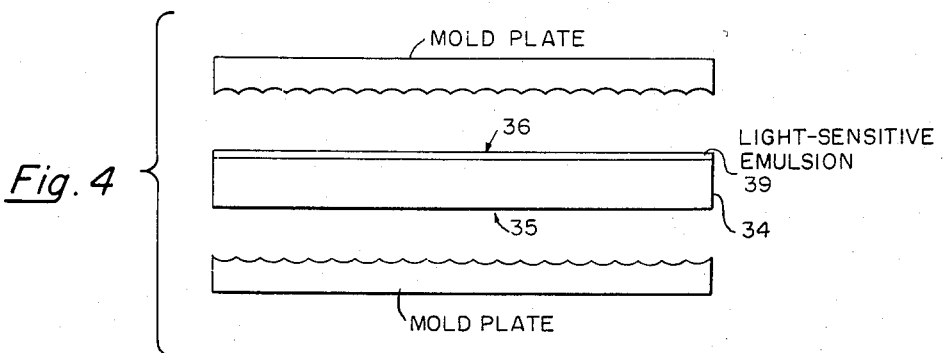
*Fig. 4*
INVENTOR.
JAMES A. OGLE
BY
ATTORNEY April 25, 1961   J. A. OGLE   2,981,941
SELECTIVE OPTICAL SCREEN AND SYSTEM
Filed Aug. 22, 1956   7 Sheets-Sheet 5
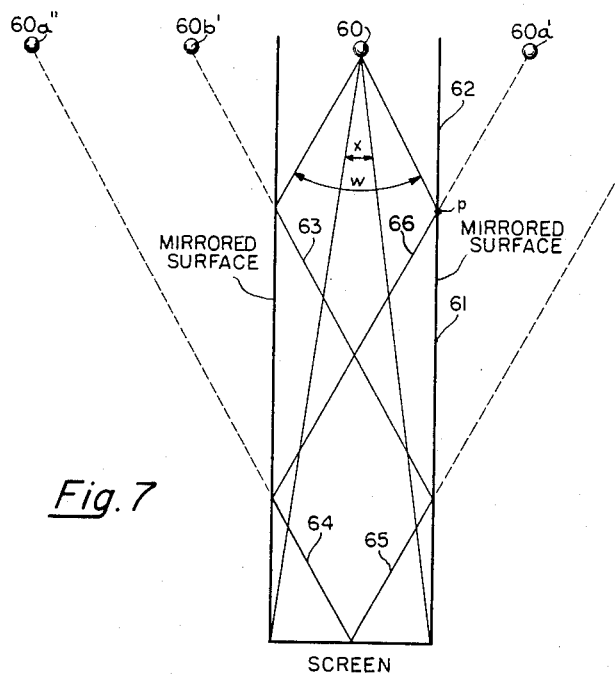
*Fig. 7*
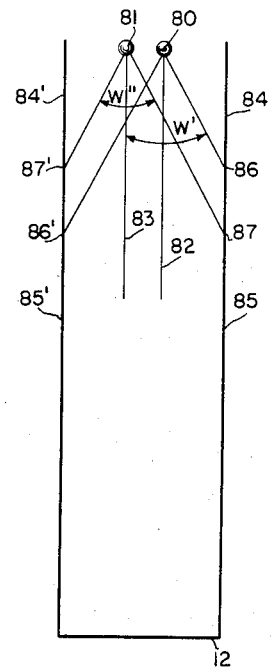
*Fig. 8*
(a) STENCIL
(b) AT TIME OF EXPOSURE
(c) AFTER DEVELOPMENT
*Fig. 9*
INVENTOR.
JAMES A. OGLE
BY
*Walter Schilpp*
ATTORNEY

*INVENTOR.*
JAMES A. OGLE

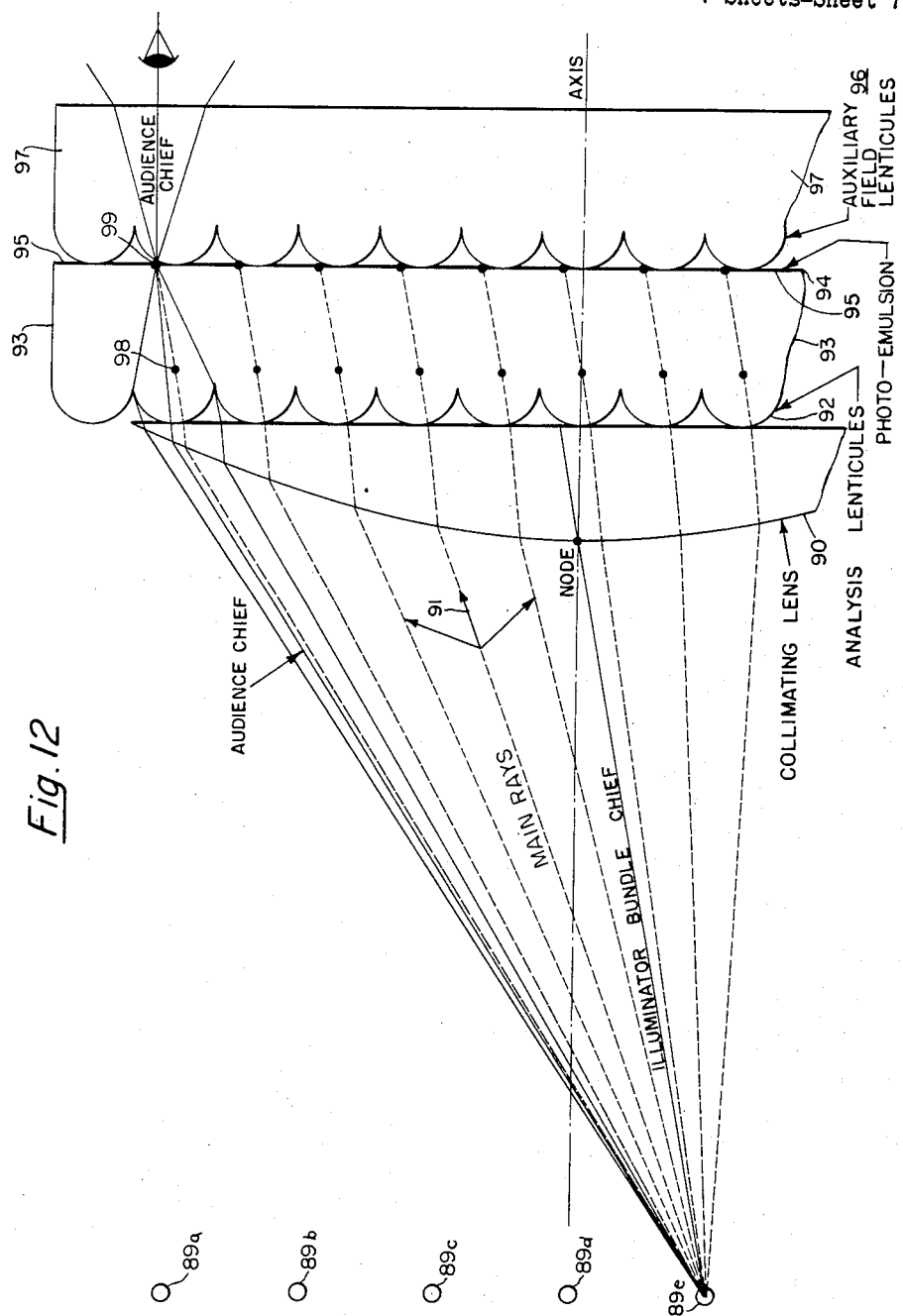

United States Patent Office 2,981,941
Patented Apr. 25, 1961

2,981,941

SELECTIVE OPTICAL SCREEN AND SYSTEM

James A. Ogle, Paoli, Pa., assignor to Burroughs Corporation, Detroit, Mich., a corporation of Michigan Filed Aug. 22, 1956, Ser. No. 605,597

5 Claims. (Cl. 340—378)

This invention relates to an optical system. The invention relates particularly to an improved unitary optical screen and to a display device utilizing such a screen for presenting at the same display position, that is, within the same display-screen area, individual images which are component parts of a prepared composite record and which are selectable therefrom in any desired and controllable order of succession. The images selected successively for individual display are clear and definite and substantially free of contamination from the non-selected images which comprise the remainder of the composite record. A plurality of such display devices may be employed in side-by-side or other adjacent position to form a register useful, for example, in electronic computers.

In my copending application, Serial No. 580,381, filed April 24, 1956, there is described and claimed a display device capable of producing individually from a single planar record selected ones of a plurality of images, and this is accomplished by a non-critical selection technique which obviates the requirement of relative motion and critical registration of precision built parts. The display device described in my said copending application includes a screen constructed of thin lenticulated optical sheets for focusing light from successively selected ones of an array of individual light sources upon discrete point areas dispersed throughout a planar photographic picture or other stencil. The individual light sources are individually energized in controllable succession to select successively corresponding ones of the recorded images, and in this manner a variety of messages may be individually displayed at a single position.

In producing at a single position individual components selected from a composite recording to the exclusion of the remainder, it is important, of course, to eliminate, or at least substantially to reduce, interference between the different components, and my copending application includes a description of means for decreasing substantially such interference.

The invention described in the present application relates particularly to means for providing a substantial increase in the brightness of the display and in the horizontal audience angle. It will be appreciated that the adequate brightness is of considerable importance since in many appliactions it is necessary that the displayed information be viewed in strong ambient light. For example, where the unit display device of the present invention is used together with other units of similar construction as a register in a high speed electronic computer to display numerical or other information to the operator, it is obviously advantageous that the displayed information be clearly readable in broad daylight.

It is an object, therefore, of the present invention to provide a display device capable of displaying with substantially uniform brightness over a wide audience angle, in rapid and controllable succession, individual images selected from, and to the exclusion of the remainder of, a composite photographic record or other stencil.

Another object of the invention is to provide a selective multiple-image display system of substantially increased brightness and increased audience angle and adapted to produce successively and selectively, by means not involving moving parts and critical registration, individual ones of a plurality of images recorded on a composite photograph record or other stencil.

Another object is to provide selective display means controlled by incident light selected from a plurality of light sources, and substantially independent of observer incidence over a relatively wide audience angle.

Another object is to provide a unitary display device adapted for use with other units of similar construction in close positional relation to serve as a register for displaying numerical or other information.

Another object is to provide a unitary structure adapted to function as a screen in the display device of the present invention or in other selective optical presentation systems.

Another object is to provide an optical screen comprising a battery of converging cellular optical elements susceptible of imaging a plurality of objects substantially in the plane of a second battery of converging cellular optical elements, the second battery in turn forming cell-by-cell images of the first battery of cells, the last-mentioned images being substantially co-existent with each other.

According to one embodiment of the present invention, these and other objects of the invention are achieved by a device comprising a housing which includes an array of lamps or other light sources individually selectable, a transparent display screen both faces of which are embossed with small cylindrical lenses or lenticulations extending in the same one direction on both faces, a composite photographic record of the plurality of component images to be displayed affixed to the lenticulated face of the screen which faces the observer position, and specularly reflective surfaces to reflect the light waves from the light sources to the screen to increase the audience angle and the brightness.

In the device above briefly described, the lenticulated surface facing the light-source array functions as an analysis lens system, while the lenticulated surface facing the observer position functions as a field lens system. There are preferably as many lamps as there are images to be selectively displayed, a different lamp being lighted for each different image. When a lamp is extinguished and a different one lighted, the image previously displayed vanishes and a new one appears in its place.

It will be understood that the terms "lenticule," "lenticular," "lenticulated," etc., as used herein define lenses having such small dimensions that they may focus light waves on single elemental picture areas which may be placed sufficiently close to other picture areas that the eye merges them into a complete uninterrupted image when viewed from a reasonable distance.

While a brief description of one embodiment of the present invention has been given above, the invention will be best understood from a consideration of the following detailed description taken together with the accompanying drawing wherein;

Fig. 3 is an enlarged side view of a preferred form of display screen;

Fig. 4 illustrates one method of producing the display screen;

Fig. 7 is a diagram relating to the mirrored side walls;

Fig. 8 is a diagram relating to the light-absorbing portions of the side walls;

Figure 10:
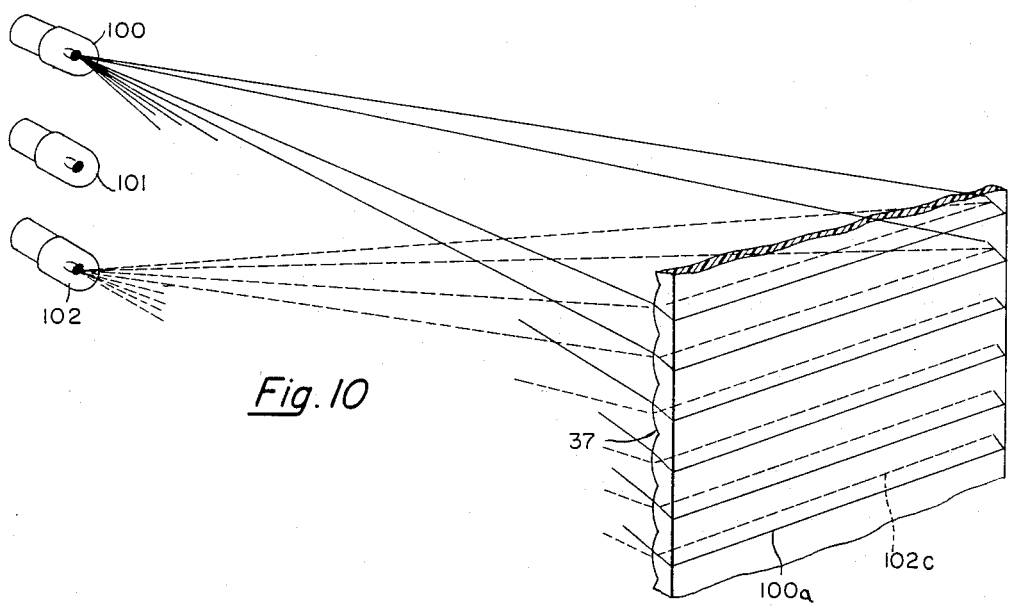
Figure 11:
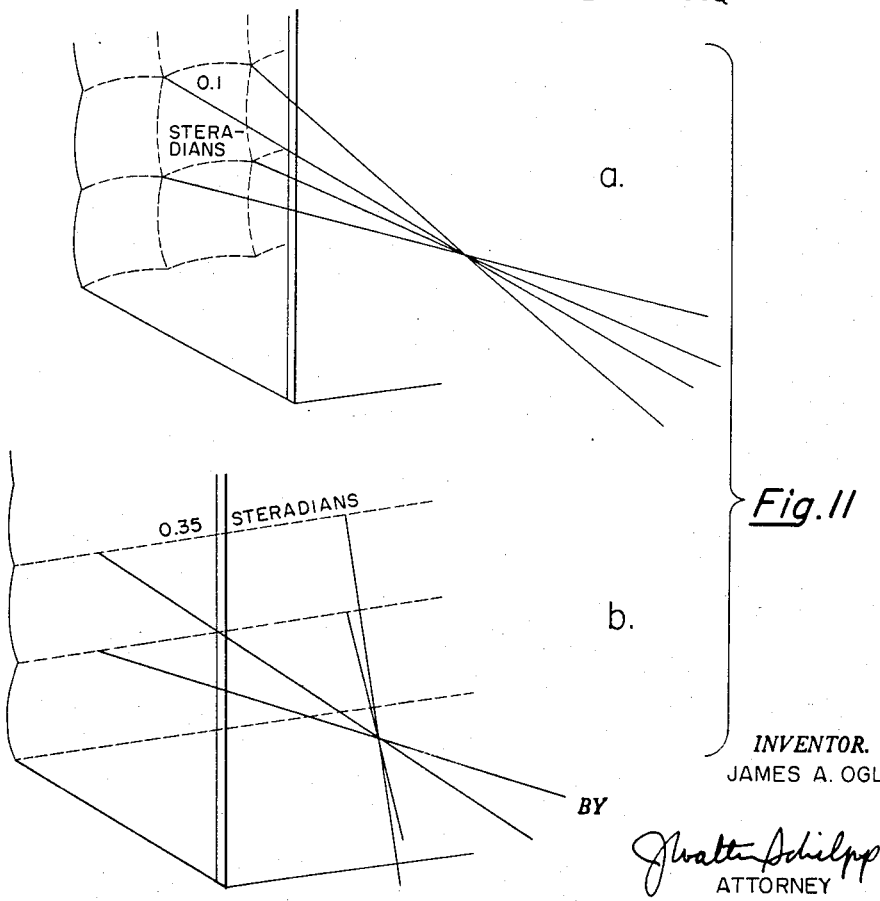

Fig. 9 relates to the development of the stencil;

Fig. 10 is a diagram relating to the optical principles of the lenticular screen;

Fig. 11 includes diagrams referred to in comparing the dual-azimuth and single-azimuth lenticular screens; and Fig. 12 is a diagram of an alternate embodiment of the invention.

Figure 1:
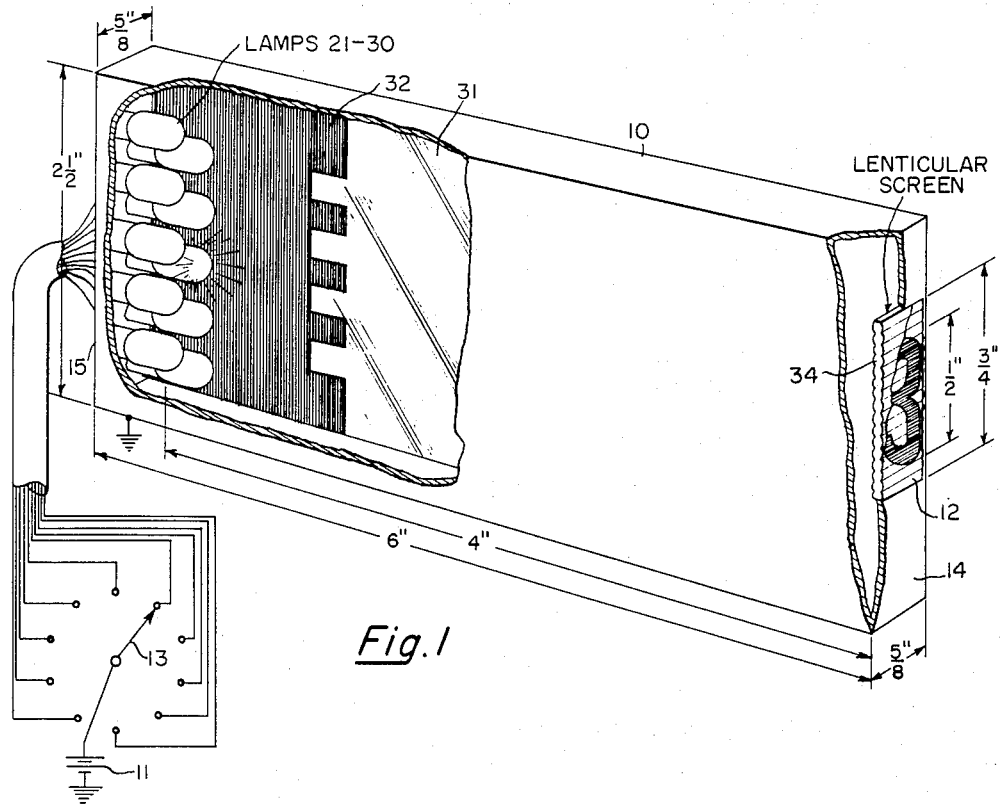
Fig. 1 is a perspective view, partially in section, of a modular display device constructed in accordance with the invention.

Referring now to Fig. 1, there is shown a display device comprising an enclosure 10 which is light-shielding except for the transparent display screen 12, located at and occupying a portion of the front wall 14 of the enclosure. Located at or near the rear wall 15 of the enclosure is a vertically disposed array of filament-type lamps 21–30, the center of the lamp array coinciding with the center of the display screen 12. Each lamp is so oriented that the effective portion of the filament is parallel to the display-screen lenticules. While a single column of lamps is desirable, presently available lamp sizes are such that, to reduce the height of the array, the lamps may be arranged in two vertical columns with the lamps of one column being staggered in position with respect to the other. The total permissible height of the lamp array depends, of course, upon a number of factors in addition to the size of the lamp envelope. Such factors include lamp filament design, enclosure width, and lenticular screen design. In general, the position of the most extreme lamps vertically should not be so far from the axis which is normal to the center of the lenticular screen as to exceed a certain critical value which is dependent upon the design limits of the lecticules.

While the interior surface of only one sidewall can be seen in the sectional-view of Fig. 1, each side wall of the enclosure 10 has an interior mirrored surface portion 31 of polished metal or other material capable of specular reflection. The remaining interior surface portion 32 of each sidewall is blackened and light absorbing, and is shown as having a rectangular toothed edge in order to compensate for the fact that the lamps are staggered in two vertical columns. This is discussed more fully hereinafter in connection with Fig. 8.

While the display device of the present invention may take different sizes, and also different shapes, illustrative dimensions are given in Fig. 1 for the display device there illustrated. As there shown, the enclosure is 6″ long, 2½″ high and ⅝″ wide. The display screen 12 is ¾″ high, ⅝″ wide and .075″ thick. The distance from the plane of the filaments of the lamp array to the display screen is 4″. These dimensions are, of course, merely illustrative and not limiting.

Display screen 12 which occupies and forms a part of front wall 14 of enclosure 10 is shown in side view in Fig. 3. In Fig. 3, the array of light sources 21–30 lies to the left of the screen at a distance which is much greater, compared with the thickness of the screen, than is indicated in Fig. 3. The observing position, indicated by the eye 3, lies to the right. Display screen 12, in preferred form, comprises a single unitary sheet 34 of light refractive material, such as plastic or glass, but preferably plastic, because of the ease with which it may be formed or embossed. Methyl methacrylate is preferable, but cellulose acetate, cellulose butyrate, and other materials are acceptable. Both faces 35, 36 of sheet 34 are embossed with corrugations 37, 38 extending in the same single direction, which in Fig. 3 is into the paper. In other words, the corrugations 37, 38 are disposed horizontally, i.e., at right angles to the vertical columns of the lamp array shown in Fig. 1. The corrugations are very small and are adjacent to each other. For illustration, there may be 60 horizontally-disposed corrugations per vertical linear inch. Each corrugation is, in effect, a cylindrical lenticule functioning as an independent lens in a manner to be more fully discussed. Affixed directly to the lenticulated surface 36 facing the observing position 33 is a light-sensitive emulsion 39 which, after exposure and development, becomes the composite-image-carrying layer.

One method of producing the display screen shown in side view in Fig. 3 is illustrated in Fig. 4. It is to be understood, of course, that since the emulsion 39 is light-sensitive, fabrication of the display screen necessarily takes place in a safe-light environment. Prior to embossing the plastic sheet 34 with the corrugations, the light-sensitive emulsion 39 is affixed to surface 36 by a suitable cement or other binder. Then, by compression molding, the corrugations 37, 38 (Fig. 3) are embossed on the faces 35, 36. While the thickness of the plastic sheet 34 is dependent upon the focal length of the lenticule facing the lamp array, as will be discussed more fully later, the plastic sheet 34 may, in an illustrative case, be .075 of an inch thick. As previously indicated, the sheet may be embossed with approximately 60 lenticules per inch on each face. However, as discussed later, the pitch of the lenticules 38 facing the observer position should be slightly greater than the pitch of the lenticules 37 facing the lamp array with the axis of the center lenticule of one face of the screen ordinarily, though not necessarily, coinciding with the axis of the center lenticule of the other face.

In Fig. 3, 51 is the center axis of the display screen and coincides with the axis of centrally located lenticules 37c, 38c. The uppermost lenticules 37u, 38u, having as their respective axis, 50, 55, these axes being displayed from each other.

The lenticulated surface facing the array of lamps functions as the objective or analysis lens system while the lenticulated surface facing the observer position functions as the field lens system. The detailed structure of these lens systems will now be described with the aid of Figs. 5 and 6.

Figure 5:
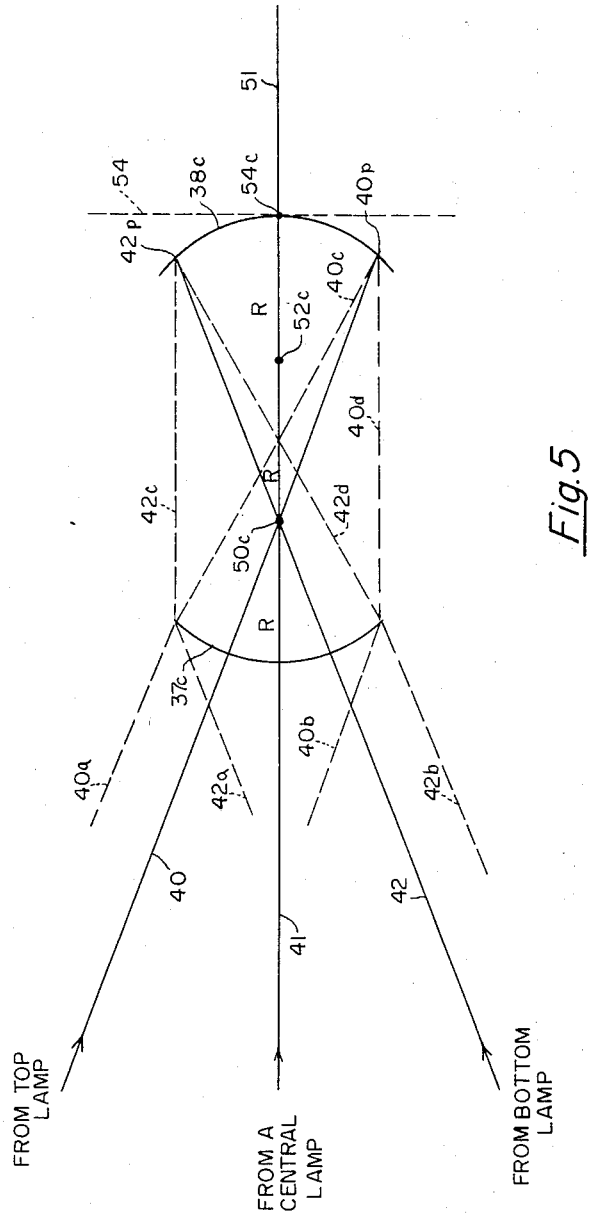
Figs. 5 and 6 are diagrams used in explaining the optical relations of the analysis and field cells of a lenticular pair.

In Fig. 5 there is shown, greatly enlarged, an analysis lenticule 37c together with its associated field lenticule 38c. The pair of lenticules shown are assumed to be centrally located between the upper and lower edges of the display screen 12. The solid lines identified by reference numerals 40, 41, 42 represent main rays from three of the ten lamps of the lamp array, only three being shown in order to avoid confusion of lines. A main ray is herein defined as one which is normal to the surface of the analysis lenticule and which, therefore, passes undeflected through the analysis lenticule 37c to meet at the center of curvature 50c of the analysis lenticule, which has a radius R.

Each lenticule of the analysis lens system, in the present embodiment, has substantially the same dimensions with respect to height and curvature. The curvature represents a compromise between conflicting requirements. It would be desirable, for example, to make the radius of curvature R shorter since this would permit the lamp array to be located closer to the screen, thus permitting the use of a smaller housing. On the other hand, it is desirable to make the radius R longer in order to more nearly approach thin lens structure with a consequent reduction in spherical aberration. In general, for a given height of lenticule (considering the lenticules to be horizontally disposed), the radius of curvature R is preferably made as short as it can be without introducing objectionable spherical aberration. Stated another way, the radius of curvature R is preferably as short as possible while still having a sufficiently small amount of spherical aberration to permit the necessary number of different displays to be adequately resolved. In one practical embodiment, which incidently is the same embodiment referred to from time to time in this application, the radius of curvature R of the analysis lenticule was about .024 inch, the height of each analysis lenticule being .0168 inch. For best results, determined empirically, the surface curvature may deviate slightly from that of an arc having a single radius.

The field lenticule 38c in Fig. 5 is so positioned, relative to the analysis lenticule 37c, as to include all of the main rays from the lamps 21–30, i.e., all of the rays which pass undeflected through the analysis lenticule and through its center of curvature 50c. As previously indicated, to avoid confusion, only three of these rays, 40, 41, 42, are shown in Fig. 5, representing rays from the top, central and bottom lamps, respectively. Field lenticule 38c is a cylindrical surface symmetrical about a point 54c located on the main axis 51 of the display screen at a distance 2R from the center of curvature 50c of the analysis lenticule. The radius of curvature of the field lenticule is, however, equal to R, with the center of curvature being a point 52c located at a distance R both from point 50c and also from point 54c. In some cases, as in the particular embodiment herein referred to from time to time, the surface of the field lenticule may deviate slightly from that of a cylinder having a radius R. While the precise curvature of the field-lenticule cylinder is, for best results, determined empirically, the design starting point is that of a cylindrical surface of radius R, and for convenience of description the field lenticules will be referred to herein as having such curvature.

In the embodiment presently being discussed, each field lenticule has substantially the same dimensions as each other field lenticule, but these dimensions are different from those of analysis lenticules. For a reason which will become clear, the height of the field lenticule is greater than that of the analysis lenticule, being .0170 for the field lenticule and .0168 for the analysis.

Dotted lines 42a and 42b represent rays emanating from the bottom lamp of the array and arriving at the extremities of the analysis lenticule 37c. These lines are shown substantially parallel to each other and to the main ray 42 from the bottom lamp since the lamp is at a distance which is great relative to the dimensions of the lenticular system, and accordingly, the rays approach the lenticule along approximately parallel paths.

The focal points of analysis lenticule 37c lie, approximately at least, along the cylindrical surface of field lenticule 38c. Hence, rays 42a and 42b after deflection by the analysis lenticule 37c, the deflected rays being identified as 42c and 42d, meet at a point 42p located on the field-lenticule surface. In like manner, rays from the top lamp, represented in Fig. 5 by the rays 40a and 40b, which pass through the analysis lenticule 37c, would after deflection by lenticule 37c, and identified as 40c and 40d, meet at point 40p. Similarly, but not shown in the drawing in order to avoid confusion of lines, all rays from a centrally positioned lamp would meet at or near point 54c, and all rays from the other lamps in the array would meet at points on the surface of the field lenticule 38c in accordance with their location in the array.

In the display screen 12, each analysis lenticule has associated therewith a field lenticule, and it will sometimes be convenient hereinafter to refer to an analysis lenticule and its associated lenticule as a lenticular pair.

Figure 6:
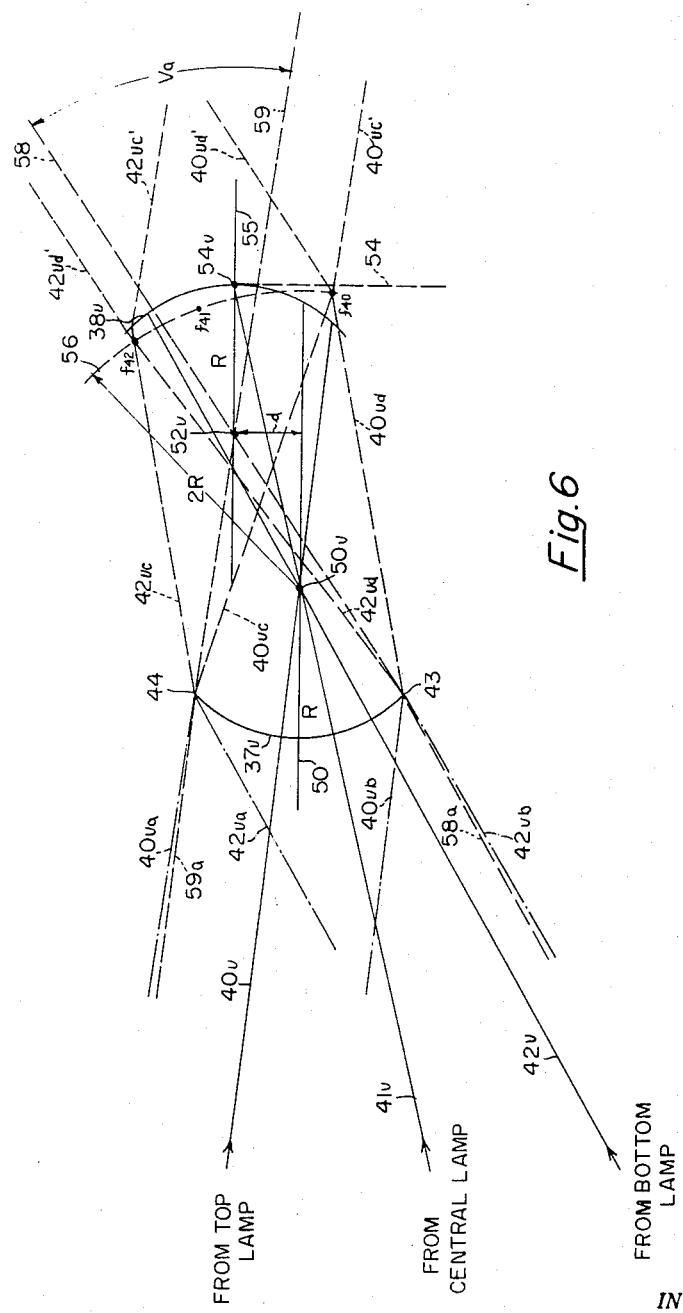

Referring now to Fig. 6, there is shown therein a lenticular pair occupying an uppermost position in the display screen. Lines 40u, 41u and 42u represent main rays coming from three of the ten lamps 21–30. Ray 40u may be assumed to come from the top lamp and ray 42u from the bottom lamp in the array. Point 50u represents the center of curvature of the analysis lenticule 37u and all of the main rays pass therethrough. The lamp array is at a relatively great distance from the display screen and the uppermost lenticular pair is located well above the central axis of the lamp array. As a consequence, the analysis lenticule 37u, presently being discussed, is not symmetrically disposed with respect to the array of main rays coming from the lamp sources.

Lines 40ua and 40ub represent boundary rays from the top lamp, i.e. rays from the top lamp which pass through the extremities of the analysis lenticule 37u. These rays are deflected by the lenticule, the deflected rays being represented by lines 40uc and 40ud, and meet at point f40. Lines 42ua and 42ub represent boundary rays from the bottom lamp which after deflection by the lenticule 37u, the deflected rays being represented by the lines 42uc and 42ud, meet at point f42. Similarly, boundary rays (not shown) from a central lamp meet at point f41. The points, f40, f41 and f42, fall on the dashed line 56. This line 56 represents the locus of the focal points of analysis lenticule for all rays from the lamp array. Line 56 also represents a cylindrical surface at a distance 2R from the center of curvature 50u of the analysis lenticule.

Solid line 38u represents the field lenticule, i.e., the uppermost field lenticule of the display screen 12. This lenticule is symmetrical about a point 54u located in a plane 54 extending vertically through point 54c (Fig. 5), point 54u being so located vertically that field lenticule 38u includes all of the main rays emanating from the lamps 21–30 and passing through the analysis lenticule 37u. As in the case of centrally located field lenticule 38c previously discussed in connection with Fig. 5, the surface of lenticule 38u is, to a first approximation at least, a cylinder having a radius R and a center of curvature 52u located on axis 55. It will be noted that axis 55 is parallel with, but displaced from, axis 50 of the analysis lenticule 37u. The distance d between axes 55 and 50 determines the pitch, i.e. the spacing between centers of curvatures, of the field lenticular surface of the display screen. Thus, while the field lenticules, in the present embodiment, are especially spaced with respect to each other, they are on somewhat greater spacing than obtains between the centers of curvature of the analysis lenticules.

The locus of the focal points of the field lenticule 38u, while not plotted in Fig. 6 in order to avoid undue confusion of lines, is approximately at the location of the analysis lenticule 37u. Thus, to a first order approximation at least, the analysis lenticule is in the focal plane of the field lenticule, and the field lenticule is in the focal plane of the analysis lenticule.

Lines 58, 59 are construction lines useful in explaining the relationship and functioning of the lenticular pair 37u, 38u. Lines 58, 59 represent what might be called the boundary main rays of the field lenticule, i.e. rays which are assumed to originate at the observer location, lying to the right in Fig. 6, and which after passing without deflection through the field lenticule 38u and through the field lenticule's center of curvature 52u, pass through the extremities 43, 44 of the analysis lenticule 37u. The lines 58, 59, by occupying boundary locations, define the vertical audience angle $V_a$.

Referring now again to ray 42ub from the bottom lamp, which after deflection by analysis lenticule 37u, becomes ray 42ud, it is to be noted that the latter, i.e. ray 42ud, will emerge from the field lenticule 38u as 42ud' substantially parallel to line 58. This follows since 42ud' and 58 both may be assumed to originate from a point 43 located at the lower extremity of analysis lenticule 37u, point 43 being, as previously indicated, substantially in the focal plane of the field lenticule 38u. Likewise, ray 40ub from the top lamp, which after deflection by analysis lenticule 37u becomes ray 40ud, will emerge from field lenticule 38u as ray 40ud', also substantially parallel to line 58 since 40ud' may also be assumed to originate at point 43.

Similarly, ray 40ua from the top lamp, and ray 42ua from the bottom lamp, which pass through the upper extremity 44 of the analysis lenticule and are deflected to become rays 40uc and 42uc, respectively, will, after passing through the field lenticule 38u, emerge as rays 40uc' and 42uc' substantially parallel, in the observer space, to line 59 which also passes through point 44.

The parallel paths of rays in the observer space with construction lines 58, 59 will obtain, not only for the top and bottom lamps, as discussed hereinabove, but also for each other lamp in the array, since each lamp will have rays passing through the extremity points 43, 44 of the analysis lenticule. Thus, the vertical audience angle $V_a$ will be substantially the same for each lamp since construction lines 58, 59 going to the extremities of the analysis lenticule are substantially parallel to the main rays 40u, 42u, from the top and bottom lamps. Moreover, the vertical audience angle for any lenticular pair will be substantially the same as the angle subtended by the array of lamps as seen from any point of the lenticular screen.

Having described, with particularity the relative position of the analysis and field lenticules of the uppermost lenticular pair, it is not believed necessary to describe the lowermost lenticular pair. It is believed to be sufficient merely to state that the relative positions of the lenticules of the lowermost pair correspond to those of the uppermost with the axis of the lowermost field lenticule being located below, rather than above, the axis of the lowermost analysis lenticule.

It will be understood that lenticular pairs located between a centrally positioned pair and an uppermost (or lowermost) pair have the axes of their analysis and field lenticules spaced apart by a distance less than that of the uppermost (or lowermost) pair according to the distance of the lenticular pair from the central axis of the display screen.

Returning now to the construction of the display device shown in Fig. 1, the brightness of the images displayed may be increased by the employment of mirrored surfaces 31 located at the side walls of the light-tight enclosure 10, as shown in Fig. 1. These surfaces may, for example, be comprised of polished chrome-plated sheet metal or other material capable of specular reflection. Such a surface will be referred to herein as a mirrored surface.

While the use of mirrored surfaces is shown in Fig. 1, the manner in which these surfaces function in the display device of Fig. 1 is best understood by reference to Fig. 7. For simplicity, Fig. 7 shows but a single light source 60. It is assumed that the distance between the light source 60 and the display screen 12 is fixed by design parameters previously mentioned. In the absence of the mirrored-surface side-wall portions, the display screen 12 would be illuminated by light waves radiating from light source 60 within the angle $x$. Where, however, each side wall is mirrored in the area indicated by the reference numeral 61 extending generally from the display screen 12 to a point $p$ located between the screen and the plane of the light source, and is light-absorptive in the area 62 extending from the point $p$ to the plane of the light source, the display screen is illuminated by light waves radiating from the light source 60 within the substantially larger angle $w$. Those light waves which are outside of the angle $x$ but within the angle $w$ are reflected from the mirrored surfaces 61 as indicated in Fig. 7 by the lines 66, 63, and re-reflected as indicated by the lines 64, 65. The reflected waves 66, 63 appear to emanate from image points 60a' and 60b' respectively, and the re-reflected waves 64, 65 appear to emanate from images 60a" and 60b". It is important, of course, that the mirrored surface 61 be smooth and substantially free of irregularities which would cause vertical dispersion.

The mirrored surface 61 in Fig. 7 corresponds to the surface 31 in Fig. 1, while the light-absorptive area 62 corresponds to the area 32. The function of the light-absorptive area will now be discussed.

It would be undesirable to permit light waves to strike the display screen at sharp angles, since tracing of such sharply-angled or skew rays through a single surface shows that, at excessive skew angles, sharpness of focus disappears and lateral magnification increases. It is to eliminate such undesirable skew rays that each side wall of the enclosure is comprised of light-absorbing material in the area indicated in Fig. 7 by the reference numeral 62 (32 in Fig. 1) extending from the light source position forward to a point $p$ such that the angle $w$ is not substantially greater than 60°. Similar results may also be obtained by other means, such as baffling at the lamps.

The total height of the lamp array is dependent upon the proximity with which the individual lamp filaments can be arranged in vertical direction. Where, to reduce the overall required height, the array of light sources comprises two columns of light bulbs, the bulbs in one column being staggered in position relative to those of the other, as shown in Fig. 1, the edge of the light-absorbing portions of each side wall may take a rectangular toothed configuration, as shown in Fig. 1. The purpose and effect of such configuration is to compensate for the fact that one column of lamps is at a different distance from one side wall than is the other column of lamps. This will be clear from Fig. 8 wherein is shown, in diagram form, a top view of an enclosure having at one end lamps in two columns represented by the reference numerals 80 and 81. It will be seen that if the light waves radiating from each column are to be limited to an angle of 60°, as mentioned above, and as indicated in Fig. 8 by the reference letters $w'$ and $w''$, symmetrical in each case about lines 82, 83 normal to the display screen 12, the light-absorbing portion 84 of the one side wall 85 should extend to point 86 for lamps in the column represented by the lamp 80 but should extend to the farther point 87 for lamps in the column represented by the lamp 81. A similar situation obtains with respect to side wall 85', but there the light-absorbing portion 84' should extend to the further point 86' for the lamps in column 80 and to the nearer point 87' for the lamps in column 81. Where the lamps in column 80 are staggered with respect to those in column 81, it can be visualized that the edge of the light-absorbing portions 84 and 84' will have a rectangular toothed configuration such as is shown in Fig. 1.

Referring again to Fig. 1, the top and bottom surfaces of the enclosure 10 are made of non-reflective material. These surfaces should neither reflect nor disperse light, nor should they obstruct the light path between the light source and the lenticular surface of the display screen.

As previously indicated, the information which is to be selectively displayed on the screen 12 is pre-recorded on a composite photographic record which is annexed to the surface of the field lenticules facing the observer position. While a photographic record is presently preferable, other forms of stencil may be employed. One manner of making the composite photographic record will now be briefly described. The work is done, of course, in a safe-light environment. While a wide variety of information may be recorded for display, let us assume, in order to simplify the present discussion, that it is desired to display selectively the numerals 0 to 9. As a first step, a separate stencil, in the form of a photographic negative, is made of each of the numerals. As shown in Fig. 9(a) the stencil preferable shows a transparent numeral against a black background. The next step is to position the display screen 12 at that same distance from the lamp array that it will be when installed in the light-tight enclosure 10. The display screen is placed with the analysis lenticular surface facing the lamp array and the field lenticular surface, with the light-sensitive-emulsion 39 cemented thereto, facing the observer position. The stencil of each numeral is then placed, one at a time, at a position located between the analysis lenticular screen and the array of lamps and at suitable distance from the lamp array. For each of the stencils, a different one of the lamps is turned on. In each instance, where the stencil permits the passage of light, the photographic emulsion on the surface of the field lenticules is exposed but, for reasons discussed hereinbelow, such exposure occurs only along the focal lines associated with the particular lamp which is lighted for that particular stencil. Thus, the exposure of a stencil of, for example, the numeral 4, results in a plurality of lines that pattern the numeral. This is illustrated in Figs. 9(b) and 9(c).

Referring now to Fig. 10, from the optical point of view the single-azimuth lenticular surface which functions as the analysis or objective lens system of the display screen consists of a battery of very small cylindrical lenses or lenticules 37 extending horizontally across the screen. Each of the lenticules is capable of focusing incident light from a point or horizontal-line source to a sharply defined line extending the length of the lenticule. Hence, for a given such source of light, a family of line images equal to the number of lenticules is formed. This is indicated in Fig. 10, where light waves from lamp 100 are shown to be focused at solid lines 100a. By changing the vertical position of the source of light, for example, by extinguishing lamp 100 and illuminating light 102, an entirely different family of line images 102c is formed, minutely displaced from the 100a group. Thus, if there are 60 horizontally-disposed lenticules per vertical linear inch of anaylsis-screen surface, 60 line images per inch would be formed for each source of light. And, where there are ten different images to be displayed and ten different sources of light vertically displaced from each other to control the selection, the system is capable of producing a total of 600 line images per vertical linear inch, of which 60 would be used to record and to display each one of the images.

Continuing now with the description of the process of making screen 12, after the photo-emulsion 39 on the display screen 12 has been exposed to each of the stencils, the emulsion is developed, thereby to produce a composite negative, one component of which (the numeral 4) is shown in Fig. 9(c).

After development of the photo-emulsion as above described, the display unit shown in Fig. 1 is assembled for use. Now, when each of the lamps is separately lighted, as by means of the battery 11 and selector switch 13, or any other suitable means, the numeral associated with that lamp will appear on the screen. Since the light waves from each lamp follow the same path they traversed at the time of exposure of the photo-emulsion, the displayed message will appear black on an illuminated background as shown in Fig. 9(c) because the black lines which were formed originally by the admission of light now prevent its passage.

In lenticular display devices, it is important that the area assigned to a character in the focal plane of a single lenticule be larger than the images of the associated filament. This is necessary to minimize crosstalk and holds in two dimensions for a dual-azimuth-selection system, but in one dimension only for a single-azimuth system. Hence, in a single-azimuth system, where the filament images are lines parallel to the longitudinal images of the lenticules, a larger fraction of the image surface can be illuminated.

In my copending application previously referred to, Serial No. 580,381, filed April 24, 1956, a dual-azimuth system is described whereas in the preferred embodiment of the present invention a single-azimuth system is employed. In the dual-azimuth system, the filament image is illuminated through the solid angle subtended by the two-dimensional spherical (about 0.1 steradian). This is illustrated in Fig. 11(a). The use of a single-azimuth system, as employed in the preferred embodiment of the present invention, permits the illumination angle to be increased in the non-selective azimuth to a practical limit which yields a total solid angle of about 0.35 steradian, as illustrated in Fig. 11(b). For simplicity, these solid angles are in equivalent air, refraction being ignored. Where the lenticule axes are disposed horizontally, as in the present embodiment, the increased illumination angle totals about 60° and corresponds to the usual horizontal audience requirements. A minimum of additional diffusion is, therefore, required. To extend the solid angle of illumination beyond the 0.35 steradian limit would usually be practical since images at point sources of extreme angles would not be resolved and crosstalk would increase, as previously mentioned in connection with the discussion of the mirrored side walls.

The form of the display screen shown in Fig. 3 and described hereinbefore, represents a preferred form. While not as simple structurally, the display screen may alternatively take the form shown in Fig. 12. As there shown, to place the lamps 89 at or near optical infinity, a plano-convex collimating lens 90 is used, the effect of which is to cause the main rays 91 of the image-forming rays to strike the analysis lenticular screen 92 at the same angle for each lenticule. This angle is different, however, for each different lamp. In the form shown in Fig. 12, a first lenticulated plastic sheet 93 functions as the analysis lens system. The thickness of sheet 93 is made equal to the focal length of the anaylsis lenticule 92. Thus, the images are focused at the plant exit surface 95 of sheet 93. The photo-emulsion or other image-carrying medium 94 is affixed to the exit surface 95. The field lenticules 96 are embossed on the surface of a second and separate sheet of plastic 97 positioned closely adjacent the plane exit surface 95 of analysis lenticular sheet 93. It will be noted that the surfaces of the field lenticules 96 are convex as seen from the lamp array, whereas in the structure shown in Fig. 3, the field lenticules are convex as seen from the observer position. In both instances, however, the function of the field lenticular system is to normalize the light waves toward the observer position, and in the structures of both Figs. 3 and 12 the field lenticules are convex in the direction of the medium having the lower index of refraction, which in these structures is air.

Returning again to Fig. 12, it will be seen that the main rays 91 from an off-the-central-axis lamp 89e, after passing through collimating lens 90 and analysis lenticules 92, pass through the centers of curvature 98 of the analysis lenticules and then through points 99 of the exit surface 95. In the embodiment shown in Fig. 12, the field lenticules 96 have the same radius and height as do the anaylsis lenticules, and the axis of each field lenticule is coincident with the axis of its associated analysis lenticule. Points 99, through which pass the main rays from off-the-axis lamp 89e, are located off the lenticule axis, and the effect of the field lenticule is to deflect the main ray so that it substantially bisects the vertical audience angle.

In the structures of either or both Figs. 3 and 12, a diffusion plate (not shown) may, if desired, be placed on the observer side of the display screen.

In the commercial embodiment, the lamp array may preferably be a readily replaceable lamp assembly.

Figure 2:
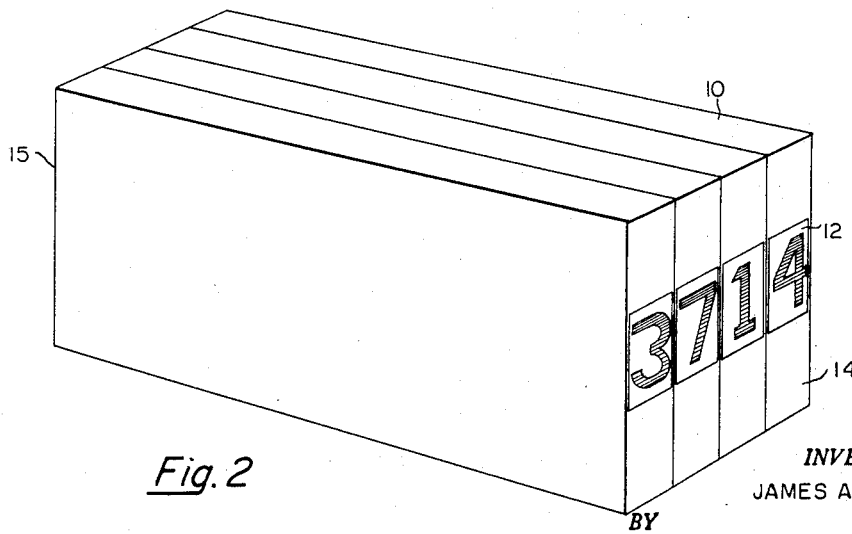
Fig. 2 is a perspective view showing four units placed in a close side-by-side relation to form a register.

The display unit shown in Fig. 1 and described in detail above is so shaped and so constructed as to be particularly adapted to be combined with similar units in closely adjacent side-by-side relation to form a register or other multi-unit display panel, one example of which is illustrated in Fig. 2. There shown is a four-module display register particularly suitable for use in a computing device to display rapidly changing numerical information. Of course, alphabetic or other information may be displayed equally readily.

The means shown and described in the present application is adapted to display individually, in a controllable order of succession, at the same display position, images selected from a composite record or other source. The selection of images displayed is controlled by, and is in response to, the incident light from a light source, with observer incidence having substantially no effect within a relatively wide audience angle. There is no relative movement of parts, thus obviating the possibility of misalignment and thereby assuring dependable trouble-free operation.

What is claimed is:
1. An optical display device comprising a housing the side walls of which are comprised at least in part of material capable of specular reflection and having at one end wall a display screen comprising a sheet of light-refractive material both faces of which are embossed with a plurality of small cylindrical lenses extending in the same one direction, the lenses of the inside face having their focal points approximately at the surface of the outside-face lenses for light waves of different angles of incidence; an array of light sources within said housing and located near the opposite end wall, the individual ones of said light sources being displaced from each other in a direction normal to the direction of said lenses, whereby incident light waves from different ones of said light sources are focused at different line locations on said outside-face lenses; and a composite-image stencil secured to and disposed on the surface of said outside-face lenses, said stencil having a different image at each of the different focal lines associated with each of the different light sources, the said different images being so disposed that illumination of a given said ilght source will illuminate, at the different said focal lines associated with said given light source, the component said images which in toto constitute a composite image representing a symbol associated with the operation of the said given light source.

2. An optical display device comprising a plurality of adjacent housings each of which has a width which is narrow relative to its height and depth and each of which is opaque except for a display screen located at one end wall, an array of n different light sources within each housing and located near the other end wall, each display screen comprising a sheet of light refractive material both faces of which are embossed with a plurality of small cylindrical lenticules disposed in a horizontal direction, the focal points of the lenticles of one face being located near the lenticular surface of the other face, the distance between the axes of adjacent outside-face lenticules being greater than between adjacent inside-face lenticules; a composite image-carrying medium disposed on said outside-face lenticules of each display screen and comprising n different images each of which is located at one of n different discrete focal lines disposed at n different vertical positions on each outside-face lenticule, each one of said n different discrete focal lines being capable of selective illumination by selective operation of one of said n different light sources, whereby operation of a selected one of said light sources will illuminate on each said outside-face lenticule one said focal line, thereby illuminating all the component images on said display screen of one of said n different composite images; each of the side walls of each said housing comprising a mirrored-surface portion and a light-absorbing surface portion, said mirrored-surface portion being located closer to said display screen and said light-absorbing portion being located closer to said array of light sources; and means for energizing selectively different ones of the said light sources.

3. An optical display device comprising a housing the side walls of which are comprised in part of material capable of specular reflection and in part of light-absorptive material and having at one end wall a display screen comprising a sheet of light refractive material both faces of which are embossed with a plurality of small cylindrical lenses extending in the same one direction, the lenses of one face having their focal points substantially at the lenses of the other face for light waves of different angles of incidence, the pitch of the lenses of the outside face being greater than the pitch of the lenses of the inside face; an array of light sources within said housing and located near the opposite end wall, the individual ones of said light sources being displaced from each other in a direction normal to the direction of said lenses, whereby incident light waves from different ones of said light sources are focused at different line locations on said outside-face lenses; and a composite-image stencil secured to and disposed on the surface of said outside-face lenses, said stencil having a different image at each of the different focal lines associated with each of the different light sources, said images being so disposed that illumination of a selected said light source will selectively illuminate the component said images of a composite said image uniquely associated with said selected light source, further particularly characterized in that said array of light sources comprises a plurality of columns with the individual light sources of one column occupying staggered positions with respect to those of another column and further characterized in that the light-absorptive and specularly reflective materials have a junction border line which has a rectangularly notched configuration.

4. In an optical device comprising an opaque housing relatively narrow by comparison with its length and height, having at one end of the said housing an array of cylindrical lenticules and, in close proximity to the said lenticules, opacities constituting components of images to be presented selectively by illumination of the said lenticules selectively from different first angles, and having near the other end of the said housing selectively operable light sources disposed at different heights in the said housing and located also at different positions along the width of the said housing: the improvement comprising in combination specularly reflecting first interior portions on the walls of the said housing defined by the height and length thereof, each said first portion extending along the length of a said wall from the end of the said housing nearest the said light sources for a distance proportional to the distance from the said wall to the nearest said light source, the proportion thereof being the same for all said light sources, whereby the said first portions all subtend equal second angles with respect to the light source nearest to each; and light absorbing second interior portions on the said walls extending from the terminations of the said first portions to the end of the said housing nearest the said array of cylindrical lenticules.

5. The improvement claimed in claim 4 characterized by the fact that the therein said equal second angles are less than sixty degrees.

References Cited in the file of this patent

UNITED STATES PATENTS

| | | |
|---|---|---|
| 1,072,426 | Clafin | Sept. 9, 1913 |
| 1,223,459 | Whitney | Apr. 24, 1917 |
| 1,984,471 | Fischer | Dec. 18, 1934 |
| 2,164,528 | Knotz | July 4, 1939 |
| 2,351,034 | Gabor | June 13, 1944 |
| 2,371,172 | Hotchner | Mar. 13, 1945 |
| 2,500,511 | Bonnet | Mar. 14, 1950 |
| 2,639,918 | Hotchner | May 26, 1953 |
| 2,751,584 | Isborn | June 19, 1956 |
| 2,787,785 | Hunter | Apr. 2, 1957 |
| 2,794,977 | Stoddart | June 4, 1957 |